US010437681B2

(12) United States Patent
Balcha et al.

(10) Patent No.: US 10,437,681 B2
(45) Date of Patent: Oct. 8, 2019

(54) METHOD AND APPARATUS OF MANAGING APPLICATION WORKLOADS ON BACKUP AND RECOVERY SYSTEM

(71) Applicant: Trilio Data, Inc., Framingham, MA (US)

(72) Inventors: Muralidhara R. Balcha, Upton, MA (US); Giridhar Basava, Sammamish, WA (US); Sanjay Baronia, South Grafton, MA (US)

(73) Assignee: Trilio Data, Inc., Framingham, MA (US)

( * ) Notice: Subject to any disclaimer, the term of this patent is extended or adjusted under 35 U.S.C. 154(b) by 430 days.

(21) Appl. No.: 14/528,215

(22) Filed: Oct. 30, 2014

(65) Prior Publication Data
US 2015/0127612 A1    May 7, 2015

Related U.S. Application Data

(60) Provisional application No. 61/897,655, filed on Oct. 30, 2013.

(51) Int. Cl.
*G06F 11/14* (2006.01)
*G06F 9/455* (2018.01)

(52) U.S. Cl.
CPC ...... *G06F 11/1451* (2013.01); *G06F 9/45533* (2013.01); *G06F 11/1453* (2013.01); *G06F 11/1458* (2013.01); *G06F 11/1484* (2013.01); *G06F 2201/815* (2013.01); *G06F 2201/84* (2013.01); *Y02D 10/26* (2018.01); *Y02D 10/28* (2018.01)

(58) Field of Classification Search
None
See application file for complete search history.

(56) References Cited

U.S. PATENT DOCUMENTS

| 7,197,665 | B2* | 3/2007 | Goldstein | G06F 11/1451 |
| | | | | 714/15 |
| 8,453,145 | B1* | 5/2013 | Naik | G06F 9/45558 |
| | | | | 718/1 |
| 9,069,983 | B1* | 6/2015 | Nijjar | G06F 21/6209 |
| 9,092,248 | B1* | 7/2015 | Makin | G06F 9/45558 |
| 9,092,375 | B1* | 7/2015 | Dalal | G06F 11/1451 |
| 9,424,136 | B1* | 8/2016 | Teater | G06F 3/065 |
| 2004/0030951 | A1* | 2/2004 | Armangau | G06F 11/1469 |
| | | | | 714/6.11 |

(Continued)

*Primary Examiner* — Richard L Bowen
(74) *Attorney, Agent, or Firm* — Goodwin Procter LLP (57) ABSTRACT

Featured are a method and apparatus for managing various point-in-time copies of workloads or applications using a software system called workload manager. An aspect of the invention is to receive backup images of point-in-time backup images of workload from a backup client and realize corresponding virtual resource from backup image on the cloud platform that is part of the workload manager appliance. Workload manager maintains catalog of point-in-time copies of workloads. Each item in the catalog refers resource entries on the cloud platform. When user wishes to instantiate a point-in-time copy, workload manager instantiates all the resources identified in the catalog entry. User can also restore a particular point-in-time workload to production system or migrate a particular point-in-time workload to remote application.

18 Claims, 9 Drawing Sheets

Typical workload configuration (56) References Cited

U.S. PATENT DOCUMENTS

| | | | |
|---|---|---|---|
| 2008/0028009 A1* | 1/2008 | Ngo | G06F 11/2097 |
| 2011/0055501 A1* | 3/2011 | Wake | G06F 11/1456 |
| | | | 711/162 |
| 2011/0258391 A1* | 10/2011 | Atkisson | G06F 11/108 |
| | | | 711/118 |
| 2012/0284707 A1* | 11/2012 | Janakiraman | G06F 3/0607 |
| | | | 718/1 |
| 2013/0227558 A1* | 8/2013 | Du | G06F 9/45558 |
| | | | 718/1 |
| 2013/0238562 A1* | 9/2013 | Kumarasamy | G06F 17/30088 |
| | | | 707/649 |
| 2013/0262923 A1* | 10/2013 | Benson | H04L 67/1097 |
| | | | 714/15 |
| 2013/0339298 A1* | 12/2013 | Muller | G06F 17/30283 |
| | | | 707/640 |
| 2014/0122578 A1* | 5/2014 | Lee | H04L 67/42 |
| | | | 709/203 |
| 2014/0201150 A1* | 7/2014 | Kumarasamy | G06F 11/1451 |
| | | | 707/639 |

* cited by examiner

Fig1: Typical workload configuration

Fig2: Workload Manager Schematic Diagram

Fig. 3 Workload manager Database Schema

Fig 4: Reconstructing workload from full back up images

Fig 5: Reconstructing workload from incremental back up images

Fig. 6 Restore a snapshot to the production

Fig. 7 Backup structure of a workload

Fig 8: Remote replication of workload backup images

Fig 9: Variable Restore

METHOD AND APPARATUS OF MANAGING APPLICATION WORKLOADS ON BACKUP AND RECOVERY SYSTEM

This application claims the benefit of U.S. Provisional Application Ser. No. 61/897,655 filed Oct. 30, 2013, the teaching of which are incorporated herein by reference in their entirety.

FIELD OF INVENTION

The present invention is directed towards computer industry and more specifically relates to methods, systems, apparatus and software for data backup and restore.

BACKGROUND OF THE INVENTION

Current methods of data protection are mostly storage based. These methods include taking a snapshot or clone of a storage device or using a very time consuming method of copying large amounts data from one storage device to another storage device; a device typically designated as a backup device. However as the applications are moving to cloud based deployments, these methods are becoming increasingly inadequate to address the needs of new generation of applications. Cloud based applications are more diverse and distributed and current methods of backing up a volume inadequately provides data protection for distributed applications. It is very common to have a workload consists of multiple virtual machines with multiple storage devices and an application specific network configuration that provides interconnectivity between the virtual machines and storage.

A typical network backup system contains a backup client, a software service running on a host computer copying the data from the host computer to backup server. The backup server stores the data to a backup media such as a magnetic tape or a space efficient file system. The backup server keeps the record of the data location and the time at which the data is backed up. User can browse the record of each data and if needed can restore a particular data to the host.

This method of backup had served the backup needs when computer applications are limited to one computer host and the application data is limited to a computer. When applications are distributed between multiple computers, this method of backup is increasingly becoming insufficient to backup distributed applications. More over as many applications are virtualized or moving to cloud computing, the backup and recovery systems are increasingly using virtual machine snapshots as a means to backup application data instead of individual files.

It thus would be desirable to provide improved or new methods, systems and software for backup and recovery for applications that are distributed between multiple computers such as those where the applications are be run using virtual memories.

SUMMARY OF THE INVENTION

Our invention provides a backup protection to the entire application stack instead of individual components of the workload. The term workload has used herein shall be understood to include or consist of multiple virtual machines with multiple storage devices and an application specific network configuration that provides interconnectivity between the virtual machines and storage. So when a backup is performed on the application, the backup method will take a consistent backup of VM images, network configuration and storage volumes in a single operation.

In its broadest aspects the present invention features, methods, systems, software and the like that are useable to manage various point-in-time copies of workloads or applications using a software system called workload manager. In a further aspect/embodiment, the invention receives backup images of point-in-time backup images of workload from a backup client and realize corresponding virtual resource from backup image on the cloud platform that is part of the workload manager appliance. The workload manager maintains a catalog of point-in-time copies of workloads. Each item in the catalog refers resource entries on the cloud platform. When user wishes to instantiate a point-in-time copy, workload manager instantiates all the resources identified in the catalog entry. User can also restore a particular point-in-time workload to production system or migrate a particular point-in-time workload to remote appliance.

According to another aspect/embodiment of the present invention there is featured, a software system called workload manager. Workload manager is responsible for managing backup images of cloud applications. Workload manager presents a RESTful end point for backup clients to stream backup data to workload manager. The backup images are either full images of various application resources including VM images, storage devices and network configuration or incremental images where only changes to resources that happened since last backup are backed up. Each set of these backup images is called point in time copy of applications.

Upon receiving the point in time copy of application, workload manager reconstructs the entire workload on the backup appliance. The reconstructed workload represents a point in time copy of running application. The reconstructed workload is self-sufficient to execute as an application on the workload manager.

Each reconstructed point-in-time workload is catalogued by its timestamp in its database. The database also includes entries for all resources of the point-in-time copy of workload. The schema of workload database is discussed below.

Since workload manager maintains point-in-time copies of the workload, the underlying storage need to efficiently store the point-in-time copies. For this purpose, workload manager assumes that the underlying storage is a de-duplication enabled storage so only modified blocks of the point-in-time copies are stored instead of duplicating unmodified blocks on the storage system.

According to other aspects/embodiments of the present invention there is featured a method or system of protecting an application. Such a method/system includes a cloud platform comprising one or more computer system, attached computer networking and storage system and a cloud operating system for provisioning compute, networking and storage resources from underlying hardware resources; an object store that supports restful api interface for reading and writing data objects, a workload manager software component that understands the backup images that are written to object store by backup application, database schema and the database to capture the workload configurations and its various revisions. In further embodiments such a workload manager is software component.

In further aspects/embodiments, the backup images are either full or incremental backup images of application.

In yet further aspects/embodiments, the workload manager software is a distributed software or applications program running on various computer nodes of the appliance.

In yet further aspects/embodiments, a workload can be application containers such as vApp or Hyper-V VM template or other means that describe a workload.

In yet further aspects/embodiments, the backup images are different type than what workload manager creates on the appliance.

In yet further aspects/embodiments, the networks are different than what is in the backup images but always one-to-one mapping between a network and a backup image to network that the workload manger creates for the backup image.

In yet further aspects/embodiments, the storage type of backup image is different than the one workload manager creates including a file that corresponds to a backup image of a physical storage volume.

In yet further aspects/embodiments, the backup images can be full backup images or incremental images with respect to last backup images.

In yet further aspects/embodiments, the object store notifies the workload manager when streaming set of backup images of a particular application completed.

In yet further aspects/embodiments, a proxy of an object store notifies workload manager when streaming set of backup images of a particular application completed.

In yet further aspects/embodiments, the application contains one or more VMs.

In yet further aspects/embodiments, the application contains one or more networks.

In yet further aspects/embodiments, the application contains one or more storage devices.

In yet further aspects/embodiments, the backup images of each component of application is streamed to object store in one or more formats including QCOW2, VMDK, VHD.

In yet further aspects/embodiments, the workload is instantly restored onto the production.

Also featured is a computer readable medium on which is store using such a described software or applications program that embodies such a workload manager system for execution on one or more computers.

Other aspects and embodiments of the invention are discussed below.

DEFINITIONS

The instant invention is most clearly understood with reference to the following definitions:

USP shall be understood to mean U.S. patent Number and U.S. Publication No. shall be understood to mean U.S. Published patent application Number.

The terms "comprising" and "including: as used in the discussion directed to the present invention and the claims are used in an open-ended fashion and thus should be interpreted to mean "including, but not limited to." Also the terms "couple" or "couples" is intended to mean either an indirect or direct connection. Thus if a first component is coupled to a second component, that connection may be through a direct connection, or through an indirect connection via other components, devices and connections. Further the terms "axial" and "axially" generally mean along or substantially parallel to a central or longitudinal axis, while the terms "radial" and "radially" generally mean perpendicular to a central, longitudinal axis.

Reference to a singular item, includes the possibility that there are plural of the same items present. More specifically, as used herein and in the appended claims, the singular forms "a," "and," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise herein, all technical and scientific terms used herein have the same meaning as commonly understood by one of ordinary skill in the art to which this invention belongs.

A computer readable medium shall be understood to mean any article of manufacture that contains data that can be read by a computer or a carrier wave signal carrying data that can be read by a computer. Such non-transitory computer readable media includes but is not limited to magnetic media, such as a floppy disk, a flexible disk, a hard disk, reel-to-reel tape, cartridge tape, cassette tape or cards, FLASH drives, USB drives, solid state hard drives, or other media using nonvolatile memory or the like; optical media such as CD-ROM and writeable compact disc; magneto-optical media in disc, tape or card form; or paper media, such as punched cards and paper tape. Such transitory computer readable media includes a carrier wave signal received through a network, wireless network or modem, including radio-frequency signals and infrared signals.

A virtual machine (VM) provides a complete system platform, which supports the execution of a complete operating system (OS). The VM emulates all physical hardware including microprocessor instruction set, motherboard chipset, hardware devices including network devices and storage devices. These are built with the purpose of either providing a platform to run programs where the real hardware is not available for use (for example, executing on otherwise obsolete platforms), or of having multiple instances of virtual machines leading to more efficient use of computing resources, both in terms of energy consumption and cost effectiveness (known as hardware virtualization, the key to a cloud computing environment), or both.

A computer appliance is generally a separate and discrete hardware device with integrated software (firmware), specifically designed to provide a specific computing resource. These devices became known as "appliances" because of their similarity to home appliances, which are generally "closed and sealed"—not serviceable by the owner. The hardware and software are pre-integrated and pre-configured before delivery to customer, to provide a "turn-key" solution to a particular problem. Unlike general-purpose computers, appliances are generally not designed to allow the customers to change the software (including the underlying operating system), or to flexibly reconfigure the hardware.

Another form of appliance is the virtual appliance, which has similar functionality to a dedicated hardware appliance, but is distributed as a software virtual machine image for a hypervisor-equipped device.

Virtual Extensible LAN (VXLAN) is a network virtualization technology that attempts to ameliorate the scalability problems associated with large cloud computing deployments. The VXLAN was officially documented by the IETF in RFC 7348 (http://tools.ietf.org/html/rfc7348).

NVGRE (Network Virtualization using Generic Routing Encapsulation) is a network virtualization technology that attempts to alleviate the scalability problems associated with large cloud computing deployments. NVGRE is formally documented at http://tools.ietf.org/html/draft-sridharan-virtualization-nvgre-00

Representational state transfer (REST) is an abstraction of the architecture of the World Wide Web; more precisely, REST is an architectural style consisting of a coordinated set of architectural constraints applied to components, connectors, and data elements, within a distributed hypermedia system. REST ignores the details of component implementation and protocol syntax in order to focus on the roles of components, the constraints upon their interaction with other components, and their interpretation of significant data elements. The REST architectural style is also applied to the development of web services.[7] One can characterize web services as "RESTful" if they conform to the constraints described in the architectural constraints section. REST, RESTful, RESTful API is formally defined at http://www.ics.uci.edu/~fielding/pubs/dissertation/rest_arch_style.htm.

A hypervisor or virtual machine monitor (VMM) is a piece of computer software, firmware or hardware that creates and runs virtual machines. A computer on which a hypervisor is running one or more virtual machines is defined as a host machine. Each virtual machine is called a guest machine. The hypervisor presents the guest operating systems with a virtual operating platform and manages the execution of the guest operating systems. Multiple instances of a variety of operating systems may share the virtualized hardware resources.

In computing, data deduplication is a specialized data compression technique for eliminating duplicate copies of repeating data. Related and somewhat synonymous terms are intelligent (data) compression and single-instance (data) storage. This technique is used to improve storage utilization and can also be applied to network data transfers to reduce the number of bytes that must be sent. In the deduplication process, unique chunks of data, or byte patterns, are identified and stored during a process of analysis. As the analysis continues, other chunks are compared to the stored copy and whenever a match occurs, the redundant chunk is replaced with a small reference that points to the stored chunk. Given that the same byte pattern may occur dozens, hundreds, or even thousands of times (the match frequency is dependent on the chunk size), the amount of data that must be stored or transferred can be greatly reduced.

This type of deduplication is different from that performed by standard file-compression tools, such as LZ77 and LZ78. Whereas these tools identify short repeated substrings inside individual files, the intent of storage-based data deduplication is to inspect large volumes of data and identify large sections—such as entire files or large sections of files—that are identical, in order to store only one copy of it.

BRIEF DESCRIPTION OF THE DRAWING

For a fuller understanding of the nature and desired objects of the present invention, reference is made to the following detailed description taken in conjunction with the accompanying drawing figures wherein like reference character denote corresponding parts throughout the several views and wherein.

DESCRIPTION OF THE PREFERRED EMBODIMENT

Referring now to the various figures of the drawing wherein like reference characters refer to like parts or method steps, there is shown in FIGS. 1-9 various views illustrating various aspects/embodiments of the present invention including the software system/program embodying the workload system of the present invention. Certain of such figures illustrate high level flow diagrams, flow charts or schematic views that illustrate methodologies or applications program logic according to a number of aspects and/or embodiments of the present invention and that are particularly suitable for backup and restore. These flow diagrams/flow charts or schematic diagrams, illustrate the structure or the logic of the present invention as embodied in computer program software for execution on a computer, digital processor, microprocessor, digital signal processor or other logic circuits (e.g., application specific integrated circuit—ASIC; programmable gate arrays—PGA) as are known in the art or hereinafter developed. Those skilled in the art will appreciate that the flow diagrams/flow charts or schematic diagrams illustrate the structures of the computer program code elements, including logic circuits on an integrated circuit that function according to the present invention. As such, the present invention is practiced in its essential embodiment(s) by a machine component that renders the program code elements in a form that instructs a digital processing apparatus (e.g., computer, microprocessor, digital processor) to perform a sequence of function step(s) corresponding to those shown in the flow diagrams.

In the following reference is made to the methodology or methodologies of the present invention for convenience. However any such reference, shall not be understood to be limiting the present invention and thus any such reference shall be understood to also include an applications program including instructions, criteria and code segments for carrying out or implementing such methodologies (e.g., such as by using a digital processing device) as well as a system, apparatus or device having such a digital processing device and such an applications program.

According to further aspects/embodiments, the present invention also features a computer readable storage medium on which is stored an applications program according to the present invention that more particularly includes instructions, criteria and/or code segments for carrying out the steps of the methodologies as herein described and embodied in such applications programs. Such a computer readable storage medium includes a storage medium that is useable in conjunction with a processor or the like (e.g., RAM, magnetic hard disk, solid state hard drive, optical disk) or a portable storage medium useable for transporting such an application(s) for later downloading (e.g., optical disk, magnetic media disks, a USB type of drive, a FLASH type of drive or a so-called external hard drive).

Figure 1:
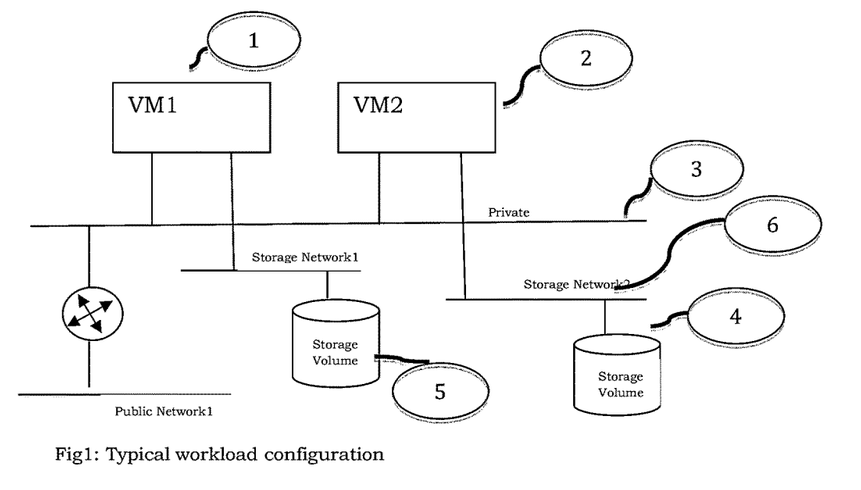
FIG. 1 is a block diagram illustrating a typical distributed application with multiple VMs, storage and network interconnect

The present disclosure is directed to a backup and restores mechanism of highly distributed applications. Referring now to FIG. 1, these applications contain one or more virtual machines 1, 2 connected to network 3 for communication. These virtual machines 1, 2 have storage 4, 5 assigned through yet another network 6. The virtual machines may be part of tiered application such as web application server, database server and a storage server or distributed databases such as MongoDB, Cassandra or CouchDB. The virtual machines may be hosted locally in a single rack, in a data center or in two different datacenters. The networking can embody any networking techniques as is known to those skilled in the art or hereinafter developed and can include VLAN based networking or virtual network such as VXLAN or NVGRE.

Each virtual machine has storage mapped for application data. The storage can be from a SAN device or locally attached storage. Distributed applications usually have their data spread across multiple resources. In order to backup these applications correctly, each resource such as virtual machine or storage or network configuration should be backup correctly but alone in a well-defined order. Likewise when restoring, all of the resources of the application should be restored in order to recover application data correctly.

Figure 2:
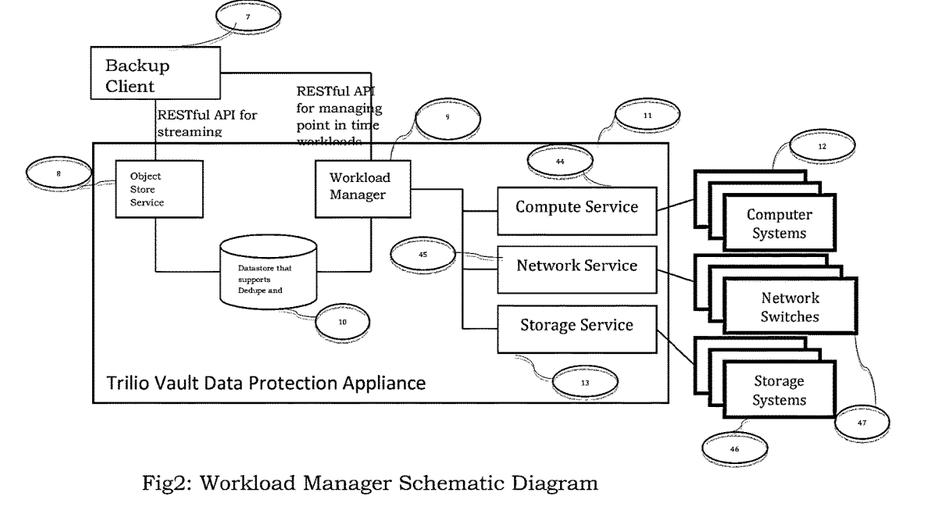
FIG. 2 is a block diagram illustrating trilio vault backup appliance
Figure 3:
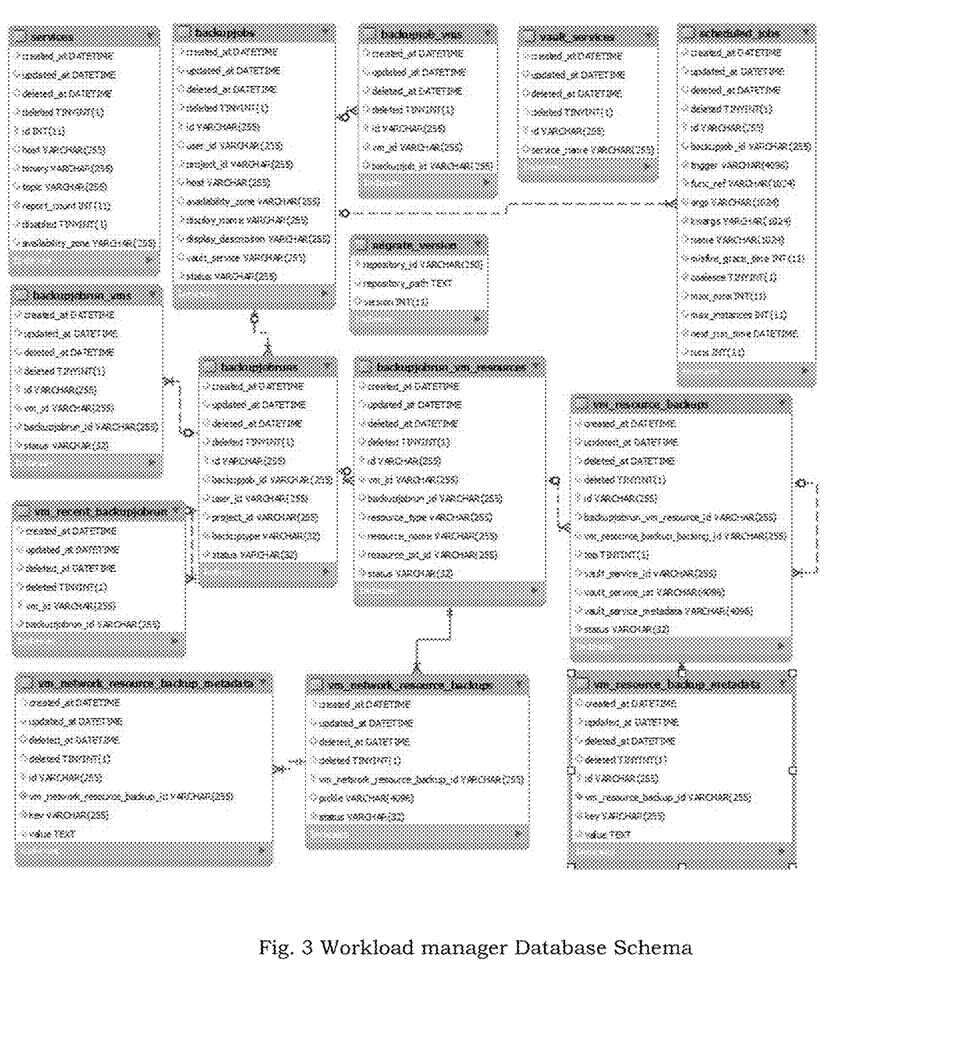
FIG. 3 is a schematic diagram illustrating the database schema for describing workloads, snapshots and their restores

Referring now to FIG. 2, there is shown a block diagram illustrating the architecture of a trilio vault backup appliance 11 according to the present invention. The trilio vault or backup appliance 11 is a distributed appliance that is or can be distributed across multiple computers. The backup appliance contains a compute service 44 that manages the compute resources 12 of the various computer systems that are part of the trilio vault backup appliance. The compute service 44 responsible for creating and deleting virtual machines as requested by the workload manager 9 on computer systems 12. The network service 45 is responsible for managing networking interconnects and network resources 46 between virtual machines and the storage service 13 manages storage resources 47 for virtual machines. Likewise storage service 13 is responsible for creating storage volumes from storage systems 46.

The Workload manager 9 is responsible for backup and recovery of application workloads. Backup client 7 is running on a production computer system hypervisor as is known to those skilled in the arts. Some examples of hypervisors are VMware ESX, Linux KVM, Citrix Xen, Microsoft Hyper-V. Some hypervisors support API interface that does not require a software component such as a backup client running on a hypervisor. Workload manager has intimate knowledge of each application and the resources that are part of the application. Workload manager quiesces desired VMs and takes a snapshot of VMs and its resources. In order not to cause any disruption to the production, it immediately resumes the VMs after taking snapshot. The snapshot operation may result in one or more data files. These data files collectively represent snapshot of the application. These data files are called backup images. These backup images are typically streams to an object store 8 by calling object store 8 RESTful API. Some examples of object stores are Amazon S3, OpenStack Swift. Object stores are data stores and are similar to file systems. In the current architecture, object store is using a portion of the data store 10 for storing backup images.

Unlike file systems, object stores use HTTP/RESTful API for reading and writing objects to objects store. Object stores are becoming popular systems for storing large data, usually for archival purposes. Both object store and workload manager share the same data store.

The data store 10 is a distributed file system that support data deduplication feature. Example of these file systems include Redhat GlusterFS, Redhat Ceph. When two point-in-time copies of the same workloads are saved on the data store, de-duplication feature of the data store avoids keeping multiple copies of the data that is present in both point-in-time copies but only stores the difference between the two copies. When multiple copies are stored on de-duplication enabled data store, the space saving multiplies.

The backup client streams all images of the workload from the production system to the object store end point. When the last image of the workload is streamed to the object store, object store notifies the workload manager through an internal mechanism about the availability of the new workload backup.

Workload manager reads the metadata of the images to learn the nature and composition of the workload. The metadata includes enough information to identify the workload, time of backup, whether the backup is an incremental or full backup.

Figure 7:
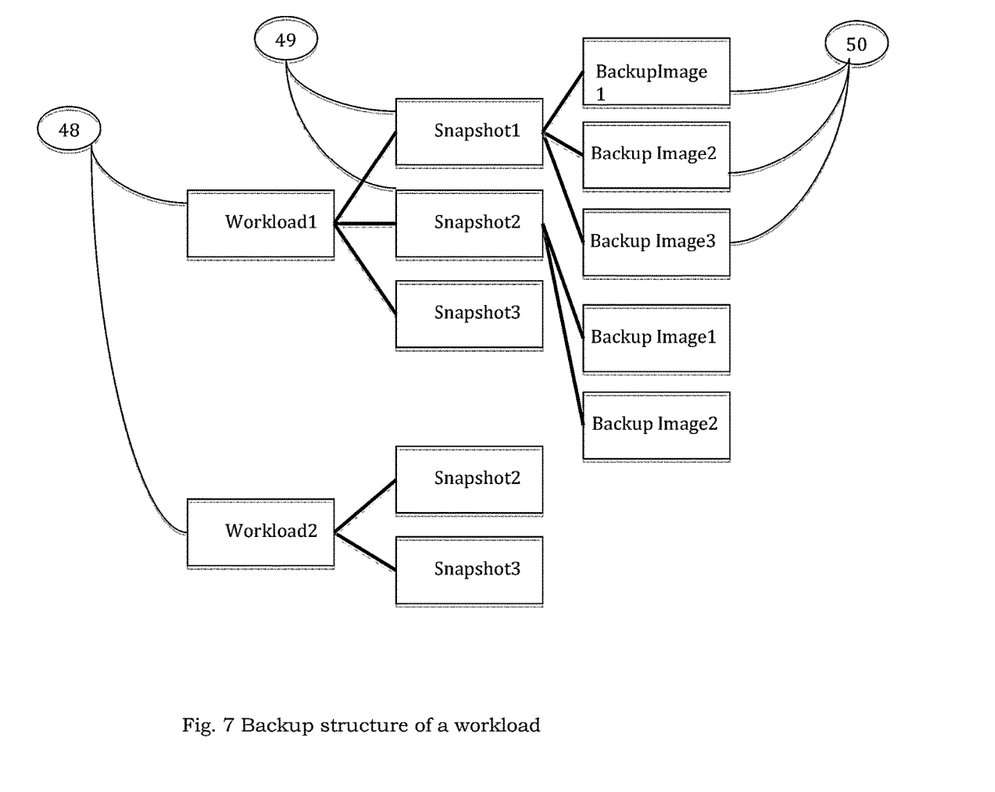
FIG. 7 is a schematic view illustrating a workload backup image structure on an object store.

Referring to FIG. 7, there is shown a directory structure of workload manager. At the highest level is the directory 48 for every workload. Each workload in its own high level directory will help us supporting disaster recovery on a per workload basis. For example, object stores usually support remote replication per container basis. In this model the workload directory maps to an object store container. If the workload policy is to support disaster recovery, workload manager enables replication feature on the workload container. Setting the replication attribute on the workload container will guarantee that all backup images of the workload are replicated to remote site, which is a needed functionality to support disaster recovery. The same structure will also help with NFS based data stores too where remote replication is support per director basis. 49 represents the snapshots of workloads. 50 represents individual backup images of various resources of the workload snapshot.

Workload manager then creates a corresponding entry in workload manager database regarding the point-in-time copy. The database schema of the workload manager is described in FIG. 3. The database schema is for illustrative purposes only to demonstrate workloads, its resources, point-in-time copies called snapshots and number of restore operations performed from a given snapshot.

Unlike traditional backup appliances, where the functionality is limited to efficient data storage of backup images, triliovault backup appliance is built on a cloud platform, which includes compute resources, networking resource and storage resources. Triliovault backup appliance is capable of recreating a working instance of application from backup images. Recreating working instance of application from backup images is called hydration and workload manager employs two different processes to hydrate a workload; one for full backup images and another from incremental backup images.

Figure 4:
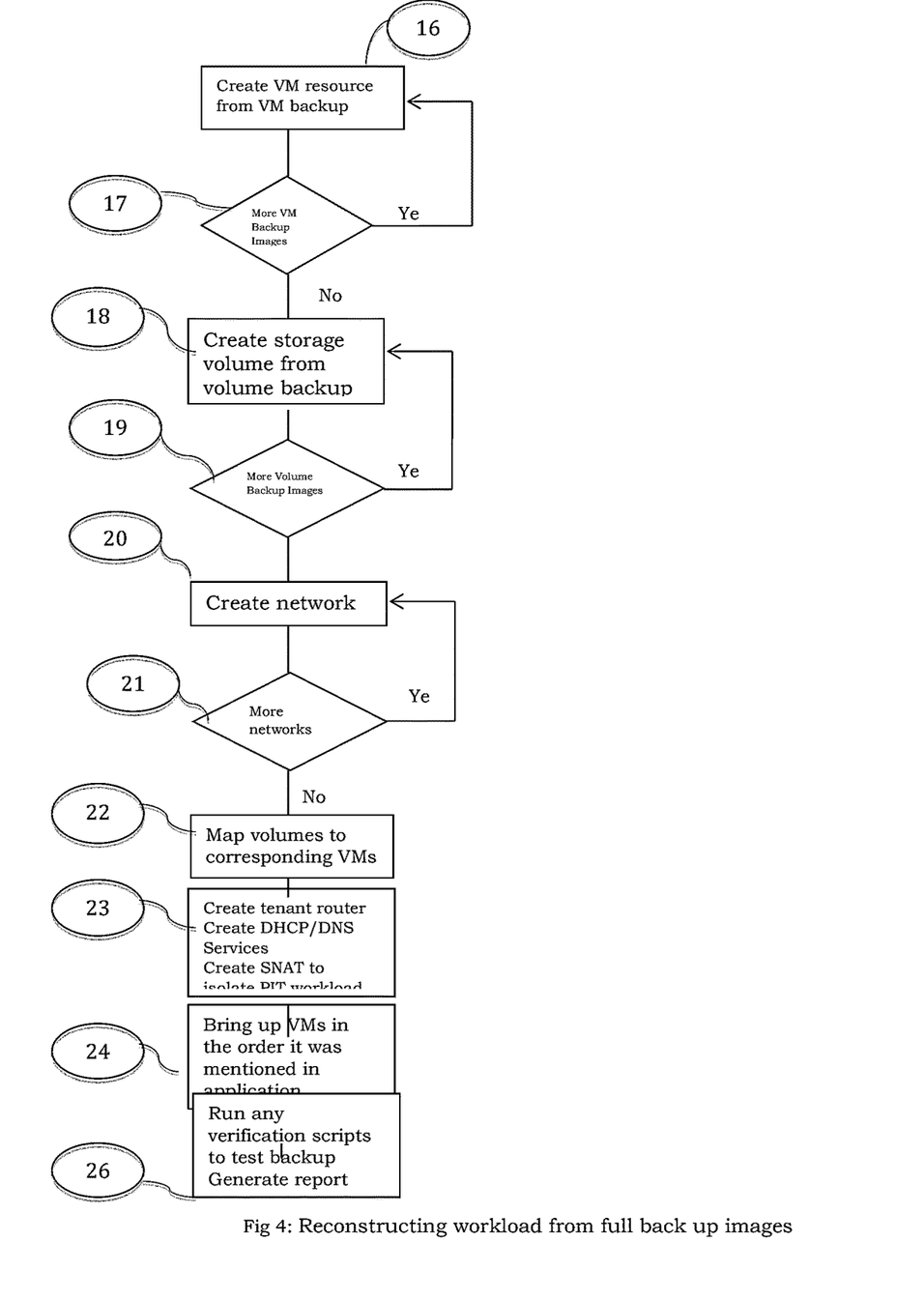
FIG. 4 is a schematic diagram illustrating the flow of recreating a workload on trilio vault appliance from full backup images

Referring to FIG. 4 there is shown a flow chart that describes how the point-in-time copy of the workload is reconstructed on the tvault backup appliance from full backup images. Remember the backup client only streams backup images to object store where they are stored. These images are not really ready to execute as an application. It is the workload manager responsibility to recreate the resources necessary to start the workload on the workload manager.

Workload manager enumerates the list of VM images that are part of the workload backup. It creates a VM as in Step 16. If there are more VM backup images as in Step 17, it creates additional VMs. After all VMs are created, workload manager determines all the storage volumes that are part of the workload backup. It creates a storage volume as in Step 18. If more storage volumes exists as in Step 19, it creates additional storage volumes. Once all storage volumes are created, workload manager looks at the network configuration file. If the backup image is a network configuration file, workload manager creates necessary networks, Step 20 by calling into network service. The types of network may not be same as the one captured in the backup images. Production networks are performance oriented and take up more hardware resources to get the desired performance that the workload demands. Workload manager does not have the same performance requirements so workload manager uses virtual networking to recreate workload networking that corresponds to production workload. These virtual networks can be overlay networks such as VXLAN. The virtual networks also support flexible network isolation primitives so instantiating multiple point in time copies of the same workloads does not interfere with each other. As a result point-in-time copies of hostnames or IP addresses need not be changed which results in a better test backup functionality for the end user. If additional networks are part of workload as in Step 21, create additional networks.

Map all volumes that were created to corresponding VM as described in the metadata file, Step 22.

The process of creating the resources based on backup images is called workload hydration. Once workload point-in-time is hydrated, the workload point-in-time is available for instantiation anytime. Workload manager always keeps all workload point-in-time copies hydrated and hence they are always available for instantiation for tenant at the click of a button. The instantiation of particular point-in-time workload is called workload hologram service.

Figure 5:
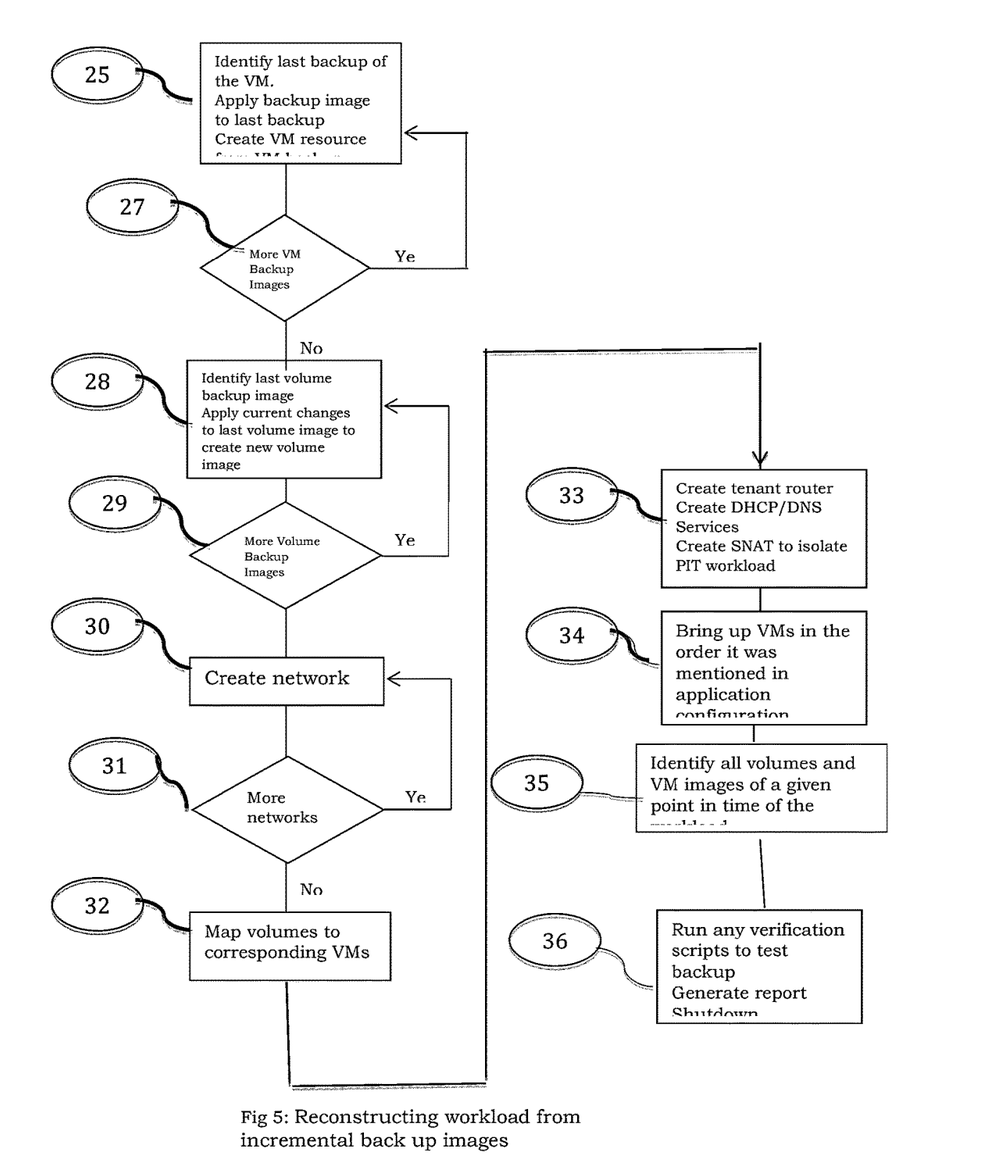
FIG. 5 is a schematic diagram illustrating the flow of recreating a workload on trilio vault appliance from incremental backup images

Referring to FIG. 5 there is shown a method of rehydrating workload from incremental backup images. Incremental backup images are significantly smaller compared to full backup images as incremental backup images only captures the changes since last backup. So in order to recreate full point in time of the workload from incremental backup images, it needs all the backup images until last full backup. This is a very time and resource intensive operation in traditional backup applications, however in our invention we only keep hydrated copies of the workload, recreating full backup from last incremental backup images requires last hydrated workload and applying latest incremental images to them. Step 25 in FIG. 5 identifies the last hydrated backup image of a VM. It makes a copy of the backup image and applies incremental changes to get new point in time copy of the VM. Copying a file in a file system usually result in IO traffic as it requires copying data from one location to new location. However deduplication enabled file system eliminates redundant copy of the data, hence these files systems has efficient APIs to create a copy of files without generating huge amount of IO traffic. Step 27 checks if more VMs are part of workload snapshot. If so it repeats Step 25 for all VMs.

Similarly as in Step 28 identify last hydrated image of the volume if the backup image is volume type and apply latest incremental changes to the volume image. Create new volume from the resulting volume image. Step 29 determines if there are additional volumes incremental images. It repeats Step 28 for all volumes.

As in Step 30, create network artifacts as described in the new network configuration. Step 31 repeats Step 30 for all additional networks. As in Step 32, map the new volume to the newly hydrated VM image. Apply firewall settings to newly created VMs as in Step 33. When required, power on the VMs in the order specified in the workload backup metadata as in Step 34. Verify that workload is up and running as in Step 35 and 36.

Figure 6:
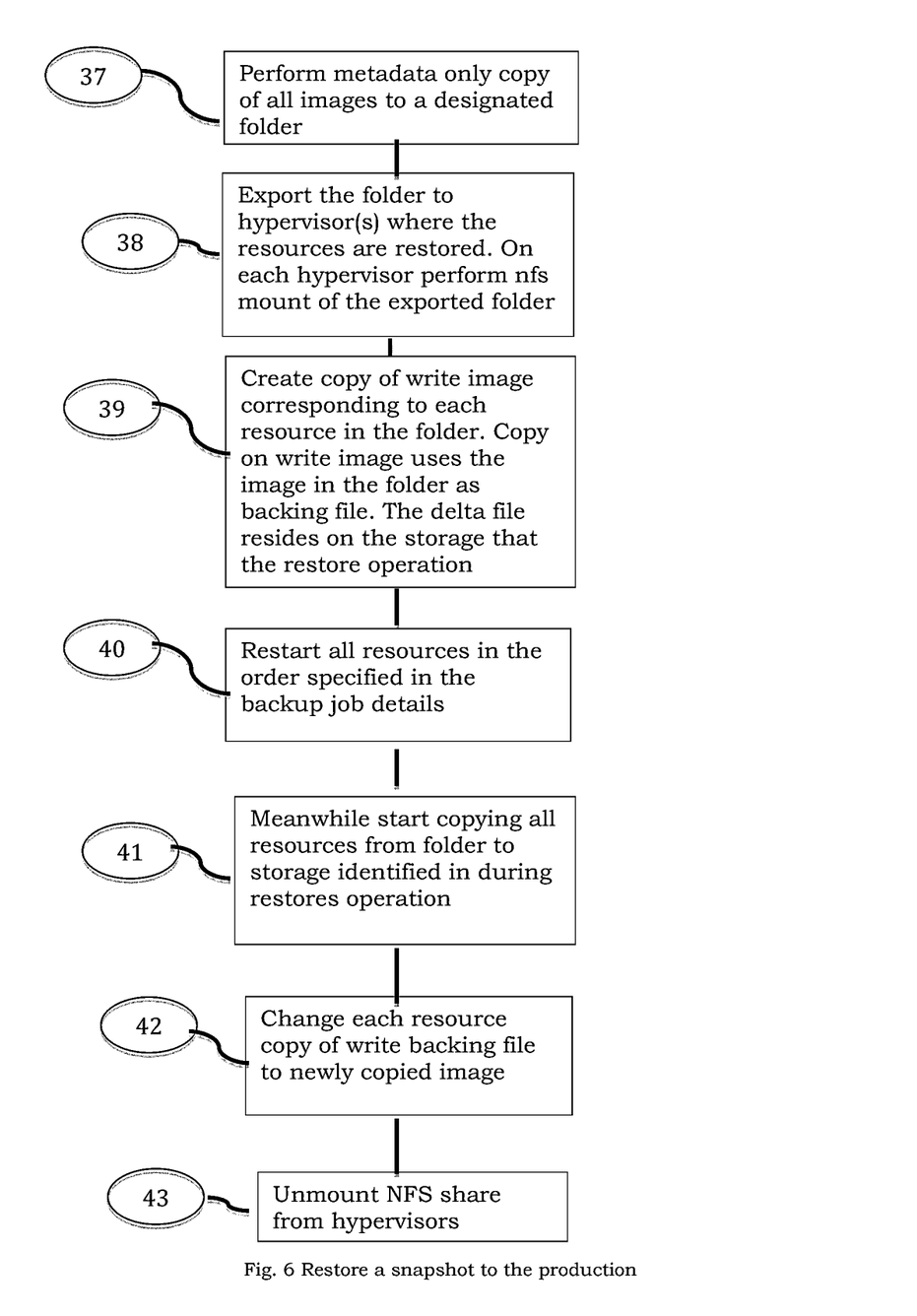
FIG. 6 is a schematic diagram illustrating the flow of restoring workload from workload backup images

Referring now to FIG. 6, there is shown a restoring process of the workload from backup image. Since trilio vault does not keep individual incremental files on the data store and completely hydrates each point in time of the workload, it employs a very efficient restore mechanism. Dedupe file systems supports efficient way of copying files without actually copying the data. Make copies of the fully recreated point in time backup images to a designated folder as in step 37. Export the folder to hypervisors where the workload artifacts will be restored, Step 38. On each hypervisor perform NFS mount of the folder. As in Step 39 create copy on write VMs from VM images in the folder. Create copy on write volumes from volume images. Copy on write artifacts uses the backup image as read-only copy and creates a delta file to record all new writes to VM and volumes so the workload is almost instantly restored to the production, Step 40. While the workload is up and running in Step 41, the backup image is copied to the production storage. At the end of copy as described in Step 42, change the VM and volumes configuration to use the readonly copy that is copied to production. Unmount the nfs share from the hypervisors, Step 43, to conclude the restore process of a workload.

Figure 8:
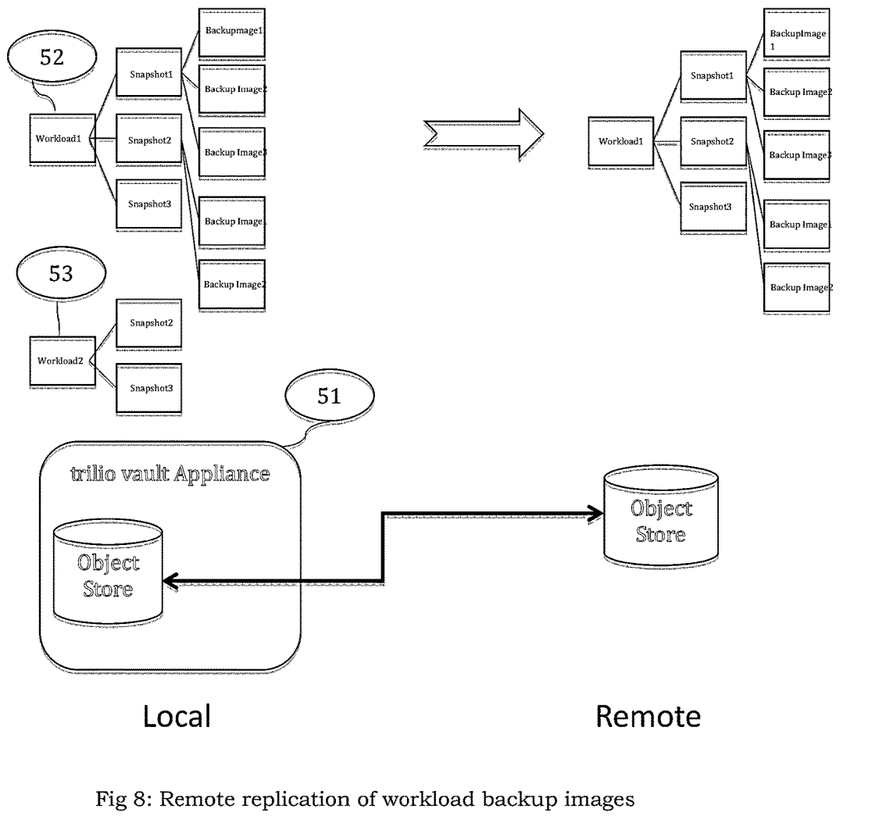
FIG. 8 is a schematic view illustrating a remote application of workload backup images

Now referring to FIG. 8, there is shown a remote replication of workload backup images to remote site. Few use cases of this functionality are disaster recovery, managed failover of workload to remote site or making a workload available to different teams in the organization for test and development purposes. There is shown a trilio vault appliance 51 with an object store and two workloads 52, 53 with various snapshot images already stored. Workload1 is setup for replication all backup images of workload1 are replicated to remote site. A trilio vault appliance that attaches to remote object store will import the workload backup images and restore at the remote site.

Figure 9:
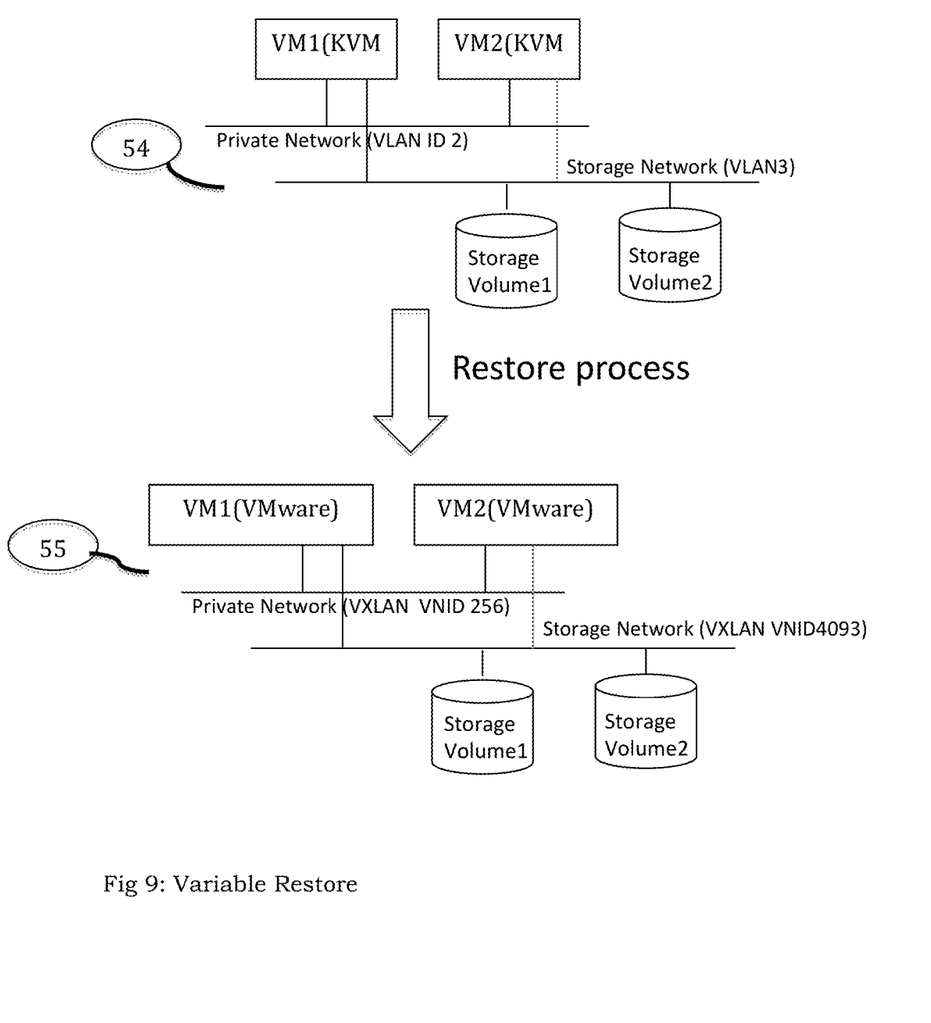
FIG. 9 is a schematic view illustrating variable restore.

Referring now to FIG. 9, there is shown a variable restore process where the target platform that a workload restored to need not match the platform it was backed up from. 54 describes a workload that that was backed from KVM hypervisor with VLAN connectivity between VMs. When a snapshot is restored to VMware based platform with VXLAN networking, workload manager translate each workload artifacts to VMware and VXLAN and restores them to the target platform as in 55. This method is useful for migrating workloads between two different platforms or to a cloud.

According to more particular aspects/embodiments of the present invention there is featured a method or system of protecting an application. Such a method/system includes a cloud platform comprising one or more computer system, attached computer networking and storage system and a cloud operating system for provisioning compute, networking and storage resources from underlying hardware resources; an object store that supports restful api interface for reading and writing data objects, a workload manager software component that understands the backup images that are written to object store by backup application, database schema and the database to capture the workload configurations and its various revisions. In further embodiments such a workload manager is software component.

In further aspects/embodiments, the backup images are either full or incremental backup images of application.

In yet further aspects/embodiments, the workload manager software is a distributed software or applications program running on various computer nodes of the appliance.

In yet further aspects/embodiments, a workload can be application containers such as vApp or Hyper-V VM template or other means that describe a workload.

In yet further aspects/embodiments, the backup images are different type than what workload manager creates on the appliance.

In yet further aspects/embodiments, the networks are different than what is in the backup images but always one-to-one mapping between a network in backup image to network that workload manger creates for the backup image.

In yet further aspects/embodiments, the storage type of backup image is different than the one workload manager creates including a file that corresponds to a backup image of a physical storage volume.

In yet further aspects/embodiments, the backup images can be full backup images or incremental images with respect to last backup images.

In yet further aspects/embodiments, the object store notifies the workload manager when streaming set of backup images of a particular application completed.

In yet further aspects/embodiments, a proxy of an object store notifies workload manager when streaming set of backup images of a particular application completed.

In yet further aspects/embodiments, the application contains one or more VMs.

In yet further aspects/embodiments, the application contains one or more networks.

In yet further aspects/embodiments, the application contains one or more storage devices. In yet further aspects/embodiments, the backup images of each component of application are streamed to object store in one or more formats including QCOW2, VMDK, VHD.

In yet further aspects/embodiments, the workload is instantly restored onto the production.

Also featured is a computer readable medium on which is store using such a described software or applications program that embodies such a workload manager system for execution on one or more computers.

Although a preferred embodiment of the invention has been described using specific terms, such description is for illustrative purposes only, and it is to be understood that changes and variations may be made without departing from the spirit or scope of the following claims.

INCORPORATION BY REFERENCE

All patents, published patent applications and other references disclosed herein are hereby expressly incorporated by reference in their entireties by reference.

EQUIVALENTS

Those skilled in the art will recognize, or be able to ascertain using no more than routine experimentation, many equivalents of the specific embodiments of the invention described herein. Such equivalents are intended to be encompassed by the following claims.

What is claimed is:

1. A system for protecting an application being executed on a computer in a distributed application environment comprising:
   a cloud platform including one or more computer systems;
   computer networking and a storage system that are attached to the cloud platform;
   a cloud operating system being configured for provisioning compute, networking and storage resources from underlying hardware resources;
   an object store that is configured to support restful api interface for reading and writing data objects to the object store, wherein the object store is coupled to the cloud platform;
   a workload manager software component configured to
   capture workload configurations and revisions including a current workload;
   identify backup images that are written to the object store by a backup application, the database schema and the database, wherein the backup images represent data files generated during a capture of a snapshot of the application;
   capture the snapshot of the application including information to be backed-up and saved to the object store, wherein during the snapshot capture one or more virtual machines (VMs) are quiesced in order to capture the snapshot, and the one or more VMs after then resumed after the snapshot is taken; and
   wherein the storage resources include a data store having a distributed file system, where the data store is configured to provide a data deduplication feature which identifies two or more snapshots in the data store, including the snapshot and at least one prior saved snapshot, identifies differences between the snapshot and the at least one prior saved snapshot, and only stores the differences between the two snapshots as an incremental image;
   identify a hydrated copy of the current workload for the application; and
   apply the latest incremental image to the hydrated copy to recreate a full data backup version of the application.

2. A method of protecting an application in a distributed application environment, the method comprising:
   providing a cloud platform including one or more computer systems;
   coupling a computer network and storage system to the cloud platform;
   configuring the cloud platform with a cloud operating system for provisioning compute, networking and storage resources from underlying hardware resources;
   coupling an object store to the cloud platform, wherein the object store supports restful api interface for reading and writing data objects to the object store;
   configuring the cloud platform to include a workload manager software component configured to capture workload configurations and revisions including a current workload, and identify backup images that are written to the object store by a backup application, database schema and the database, wherein the backup images represent data files generated during a capture of a snapshot of the application;
   capturing the snapshot of the application including information to be backed-up and saved to the object store;
   quiescing one or more virtual machines (VMs) during the snapshot capture;
   resuming the one or more VMs after taking the snapshot, wherein the storage resources include a data store having a distributed file system, where the data store is configured to embody a data deduplication feature;
   identifying, via the data deduplication feature, two or more snapshots in the data, including the snapshot and at least one prior saved snapshot;

identifying differences between the snapshot and the at least one prior saved snapshot, and only stores the differences between the two snapshots as an incremental image;

identifying a hydrated copy of the current workload for the application; and applying the latest incremental image to the hydrated copy to recreate a full data backup version of the application.

3. The method of claim 2, wherein the backup images include at least one of full backup images of the application or incremental backup images of the application.

4. The method of claim 2, where the workload manager software component is a distributed software running on various computer nodes of an appliance.

5. The method of claim 2, wherein a workload configuration includes application containers such as vApp or Hyper-V VM template that describe the current workload.

6. The method of claim 2, wherein the backup images are a different type than a type of backup images created by the workload manager on an appliance.

7. The method of claim 2, wherein a one-to-one mapping is maintained between a network associated with the backup images to a network associated with the workload manager software component when creating the backup images.

8. The method of claim 2, where a storage type of the backup image is different than a backup image used by the workload manager software component.

9. The method of claim 2, where the backup images of the snapshot are at least one of full backup images or incremental images with respect to a backup images of the at least one prior save snapshot.

10. The method of claim 2, wherein the object store is configured to notify the workload manager when streaming a set of backup images of a particular application is completed.

11. The method of claim 2, wherein the object store includes a proxy that is configured to notify the workload manager when streaming a set of backup images of a particular application is completed.

12. The method of claim 2, wherein the application contains one or more VMs.

13. The method of claim 2, wherein the application contains one or more networks.

14. The method of claim 2, wherein the application contains one or more storage devices.

15. The method of claim 2, wherein the backup images of each component of the application are streamed to the object store in one or more formats including QCOW2, VMDK, VHD.

16. The method of claim 2, further comprising:
converting backup images from a current backup format to a target friendly format associated with a target location via a restoring backup software component.

17. The method of claim 2, further comprising:
converting network settings of a backup to a target platform native format.

18. The method of claim 2, further comprising:
converting compute/network and storage resources to a target platform format; and
populating data from the backup.

* * * * *